United States Patent
Hwang

(10) Patent No.: US 8,585,783 B2
(45) Date of Patent: Nov. 19, 2013

(54) NATURAL DYEING METHOD OF FIBER USING AN INDIGO PLANT

(76) Inventor: Su Hwan Hwang, Jeonnam (KR)

( * ) Notice: Subject to any disclaimer, the term of this patent is extended or adjusted under 35 U.S.C. 154(b) by 0 days.

(21) Appl. No.: 13/821,291

(22) PCT Filed: Aug. 17, 2011

(86) PCT No.: PCT/KR2011/006028
§ 371 (c)(1),
(2), (4) Date: Mar. 7, 2013

(87) PCT Pub. No.: WO2012/050299
PCT Pub. Date: Apr. 19, 2012

(65) Prior Publication Data
US 2013/0167306 A1    Jul. 4, 2013

(30) Foreign Application Priority Data
Oct. 15, 2010 (KR) .......................... 10-2010-0100656

(51) Int. Cl.
*D06P 5/12* (2006.01)
(52) U.S. Cl.
USPC ....................................... 8/646; 8/653; 8/932
(58) Field of Classification Search
USPC ............................................. 8/646, 653, 932
See application file for complete search history.

(56) References Cited

U.S. PATENT DOCUMENTS 5,611,822 A  *  3/1997  Gurley .............................. 8/625

FOREIGN PATENT DOCUMENTS

| JP | 10-114862 A | 5/1998 |
|---|---|---|
| KR | 10-0264675 B1 | 9/2000 |
| KR | 10-0420990 B1 | 3/2004 |
| KR | 10-2006-0026572 A | 3/2006 |

* cited by examiner

*Primary Examiner* — Eisa Elhilo
(74) *Attorney, Agent, or Firm* — Rabin & Berdo, P.C.

(57) ABSTRACT

Provided is a natural dyeing method of a fiber using an indigo plant. The natural dyeing method includes dissolving a water-soluble pigment present in leaves of the indigo plant in water to mix the water containing the water-soluble pigment with lime powder and air, concentrating the resulting mixture into an insoluble pigment, mixing the concentrated indigo plant dye with caustic soda to reduce the resulting mixture into a water-soluble pigment through microbial fermentation, immersing a fiber in the soluble indigo plant dye solution to dye the fiber, and bringing the dyed fiber into contact with air to convert the soluble indigo plant dye solution into the insoluble pigment again, thereby completing natural dyeing using the indigo plant. Therefore, the natural dyeing can be performed at a very fast dyeing rate, and the fiber can show excellent color fastness. Also, the fiber cannot be easily discolored by water or detergent, and can be useful in preventing water pollution or dermatitis.

6 Claims, 1 Drawing Sheet

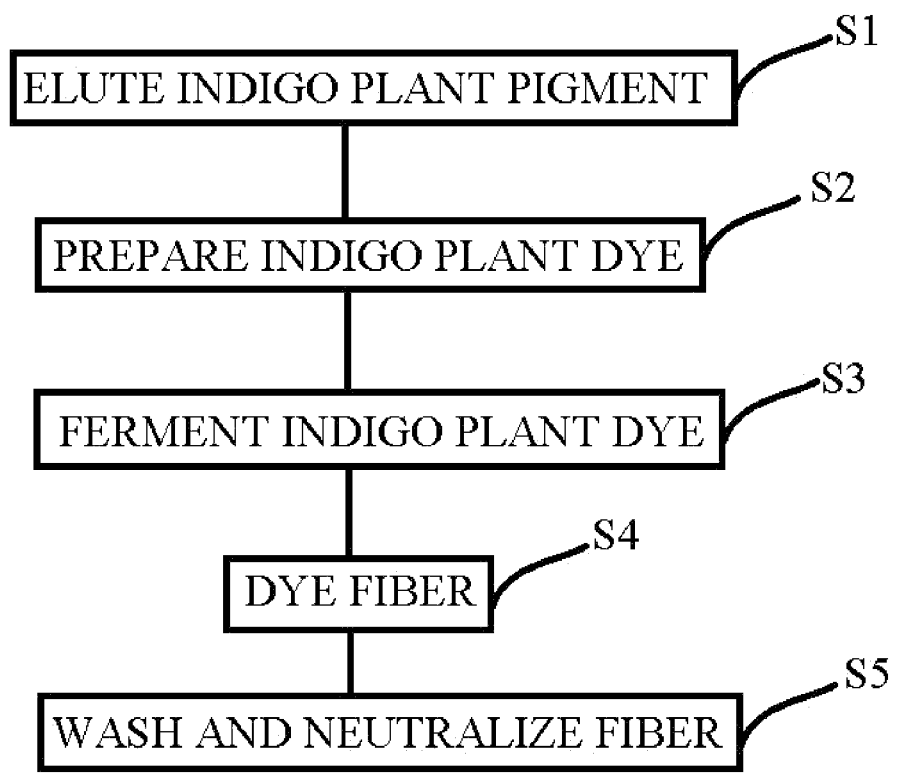

NATURAL DYEING METHOD OF FIBER USING AN INDIGO PLANT

TECHNICAL FIELD

The present invention relates to a natural dyeing method of a fiber using an indigo plant, and, more specifically, to a natural dyeing method of a fiber using an indigo plant, which includes dissolving a water-soluble pigment present in leaves of the indigo plant in water to mix the water containing the water-soluble pigment with lime powder and air, concentrating the resulting mixture into an insoluble pigment, mixing the concentrated indigo plant dye with caustic soda to reduce the resulting mixture into a water-soluble pigment through microbial fermentation, immersing a fiber in the soluble indigo plant dye solution to dye the fiber, and bringing the dyed fiber into contact with air to convert the soluble indigo plant dye solution into the insoluble pigment again, thereby completing natural dyeing using the indigo plant, wherein the natural dyeing can be performed at a very fast dyeing rate, and the fiber can show excellent color fastness, cannot be easily discolored by water or detergent, and can be useful in preventing water pollution or dermatitis.

BACKGROUND ART

In general, trousers normally referred to as jeans were first worn by sailors or miners. Recently, however, jeans have become popular clothing that is prepared in various forms and worn by men and women of all ages, with synthetic fibers such as Lycra or spandex rayon being added to the jeans to improve fashionability.

A method of dyeing such jeans depends mainly on a chemical dyeing method using a chemical dye, and thus has an advantage in that the cost of a product may be reduced since the jeans are dyed in a bright color and a dyeing process is simple.

However, the above-described chemical dyeing method has problems in that severe water pollution may be caused by wastewater formed after dyeing the jeans with a dye, and dermatitis may develop when the remnant of the dye used to dye fabrics is in direct contact with the skin.

DISCLOSURE

Technical Problem

The present invention is designed to solve the problems of the prior art, and therefore it is an object of the present invention to provide a natural dyeing method of a fiber. Here, the natural dyeing method includes dissolving a water-soluble pigment present in leaves of the indigo plant in water to mix the water containing the water-soluble pigment with lime powder and air, concentrating the resulting mixture into an insoluble pigment, mixing the concentrated indigo plant dye with caustic soda to reduce the resulting mixture into a water-soluble pigment through microbial fermentation, immersing a fiber in the soluble indigo plant dye solution to dye the fiber, and bringing the dyed fiber into contact with air to convert the soluble indigo plant dye solution into the insoluble pigment again, thereby completing natural dyeing using the indigo plant. Therefore, the natural dyeing can be performed at a very fast dyeing rate, and the fiber can show excellent color fastness. Also, the fiber cannot be easily discolored by water or detergent, and can be useful in preventing water pollution or dermatitis.

Technical Solution

According to one exemplary embodiment of the present invention, a natural dyeing method of a fiber includes an indigo plant pigment elution operation of eluting a water-soluble indigo plant pigment by filling a container with an indigo plant and water having a predetermined temperature and extracting the mixture of the indigo plant and the water for a given period of time, an indigo plant dye preparation operation of preparing an indigo plant dye by injecting lime powder and air into the indigo plant extract eluted in the indigo plant pigment elution operation, decanting water when an insoluble indigo plant pigment formed by bonding oxygen to the indigo plant pigment is condensed and precipitated due to cohesion caused by a chemical reaction of the lime powder and removing moisture from the insoluble indigo plant pigment condensed with the lime powder, an indigo plant dye solution fermentation operation of reducing the insoluble indigo plant pigment into a water-soluble indigo plant pigment by aging a dye solution, which is prepared by mixing caustic soda with the indigo plant dye prepared in the indigo plant dye preparation operation, at a predetermined temperature for a given period of time, adding a sugar and performing microbial fermentation on the dye solution for a given period of time, and a fiber dyeing operation of dyeing a fiber by immersing the fiber in the indigo plant dye solution microbially fermented in the indigo plant dye solution fermentation operation for a given period of time.

Advantageous Effects

According to the present invention, the natural dyeing method of a fiber using an indigo plant, which includes dissolving a water-soluble pigment present in leaves of the indigo plant in water to mix the water containing the water-soluble pigment with lime powder and air, concentrating the resulting mixture into an insoluble pigment, mixing the concentrated indigo plant dye with caustic soda to reduce the resulting mixture into a water-soluble pigment through microbial fermentation, immersing a fiber in the soluble indigo plant dye solution to dye the fiber, and bringing the dyed fiber into contact with air to convert the soluble indigo plant dye solution into the insoluble pigment again, thereby completing natural dyeing using the indigo plant, wherein the natural dyeing can be performed at a very fast dyeing rate, and the fiber can show excellent color fastness, cannot be easily discolored by water or detergent, and can be useful in preventing water pollution or dermatitis.

Also, the natural dyeing method using an indigo plant can be used to prevent water pollution or dermatitis.

DESCRIPTION OF DRAWINGS

FIG. 1 is a block view showing a natural dyeing method of a fiber using an indigo plant according to the present invention.

BEST MODE

Hereinafter, preferred embodiments of the present invention will be described in further detail with reference to the accompanying drawing.

The natural dyeing method of a fiber using an indigo plant according to the present invention includes an indigo plant pigment elution operation (S1), an indigo plant dye preparation operation (S2), an indigo plant dye solution fermentation operation (S3), a fiber dyeing operation (S4), and a washing and neutralizing operation (S5).

1. Indigo Plant Pigment Elution Operation (S1)

The indigo plant pigment elution operation (S1) includes filling a container having a predetermined capacity with an indigo plant and water having a predetermined temperature and extracting the mixture of the indigo plant and the water for a given period of time to elute a water-soluble indigo plant pigment.

That is, leaves and stems of the indigo plant are put into the container to the maximum level possible, and water is also added to the container. In this case, the leaves and stems of the indigo plant may be immersed in water.

Also, the indigo plant is harvested from July to September. In this case, a temperature of water required to elute an indigo plant pigment is changed according to changes in weather and temperature at the harvest time. That is, the water temperature and extraction time exert a great influence on dissolution of the indigo plant pigment.

Therefore, the indigo plant may be extracted in water filled in the container at a temperature of 15 to 30° C. for 40 to 70 hours.

In this case, the indigo plant pigment may be extracted for 51 to 70 hours when the water temperature is in a range of 15 to 19° C., and the indigo plant pigment may be extracted for 40 to 50 hours when the water temperature is in a range of 20 to 30° C.

That is, the extraction time may be shortened since the indigo plant pigment is easily dissolved in water with an increase in water temperature. On the other hand, the extraction time may be lengthened since the indigo plant pigment is not easily dissolved in water with a decrease in water temperature.

Meanwhile, when the indigo plant dye is kept in a water temperature exceeding 30° C. for a given period of time (approximately 48 hours), the indigo plant dye may rot due to putrefactive bacteria. On the other hand, when the water temperature is less than 15° C., the indigo plant pigment may not be easily dissolved in water.

Also, when the leaves and stems of the indigo plant are taken out of the container in which the indigo plant pigment is eluted, an amount of the water containing the indigo plant pigment amounts to a half of the total capacity of the container. For example, on the assumption that a 200 L container is used, approximately 100 L of an indigo plant extract is prepared when the leaves and stems of the indigo plant are taken out of the container.

2. Indigo Plant Dye Preparation Operation (S2)

The indigo plant dye preparation operation (S2) includes injecting lime powder and air into the indigo plant extract in which the water-soluble indigo plant pigment is eluted in the indigo plant pigment elution operation (S1), decanting water when an insoluble indigo plant pigment formed by bonding oxygen to the indigo plant pigment is condensed and precipitated due to cohesion caused by a chemical reaction of the lime powder, and removing moisture from the insoluble indigo plant pigment condensed with the lime powder to prepare an indigo plant dye.

More particularly, the indigo plant dye preparation operation (S2) includes preparing an indigo plant dye by concentrating the indigo plant pigment, that is, the following operations are performed.

First, shells of shellfishes (cockles, oysters, densely lamellated oysters, etc.) are baked and calcined at a high temperature (1000 to 1200° C.) for 24 hours to prepare lime powder.

Baking the shells at 1000 to 1200° C. makes the shells into lime powder. In this case, the shells may be baked at a temperature of 1000 to 1200° C. in the case of a firewood oven, and baked at a temperature of 1200° C. or more in the case of a gas oven.

In addition, a time required to bake the shells in the firewood oven may be approximately 24 hours. Since the shells baked in the gas oven are baked at a temperature of 1200° C. or more, the baking time may be shortened.

In this case, when the shells are baked at a temperature of less than 1200° C., the shells are not easily baked, and thus not made into lime powder. On the other hand, when the baking temperature exceeds 1200° C., expensive equipment may be required.

Next, the lime powder is added at a content of 100 to 500 g, based on 100 L of the indigo plant extract eluted in the indigo plant pigment elution operation (S1).

In this case, when the lime powder is added at a content of less than 100 g based on 100 L of the indigo plant extract in the container, the cohesion required to condense the indigo plant pigment may be lowered. On the other hand, when the content of the lime powder exceeds 500 g, the purity of the indigo plant pigment may be degraded due to an increase in content of the lime powder.

Meanwhile, when the lime powder is added to the indigo plant extract, a chemical reaction between the lime powder and the indigo plant extract may take place. As a result, the lime powder serves to emit hot air and become a semi-solid phase due to cohesion.

In this case, an insoluble indigo plant pigment to be described later is condensed with the lime powder due to the cohesion caused by the chemical reaction of the lime powder.

Subsequently, air is injected to the indigo plant extract to which the lime powder is added. In this case, the air injection is performed until a color of the indigo plant extract turns from pale green (sea green to chartreuse) to indigo.

The air may be injected immediately after the lime powder is added to the indigo plant extract, and may be injected before/during addition of the lime powder to the indigo plant extract.

A method of injecting air may be performed by injecting air bubbles from the bottom of the container filled with the indigo plant extract to uniformly mix lime powder with the indigo plant extract. When the lime powder is uniformly mixed with the indigo plant extract, the insoluble indigo plant pigment may be effectively condensed within a short period of time due to the cohesion caused by a chemical reaction of the lime powder.

Meanwhile, when the air is injected into the indigo plant extract, the water-soluble indigo plant pigment dissolved in the indigo plant extract is bound to oxygen in the air. In this procedure, a color of the indigo plant extract turns from pale green (sea green to chartreuse) through yellow and green to indigo. In this case, the water-soluble indigo plant pigment is converted into an insoluble indigo plant pigment. Also, the air injection is stopped when the indigo plant extract turns dark blue.

Then, as the insoluble indigo plant pigment is condensed and precipitated onto the bottom of the container due to the cohesion caused by the chemical reaction of the lime powder, the insoluble indigo plant pigment is separated from water. Then, the water is decanted, and moisture is removed from the insoluble indigo plant pigment condensed with the lime powder to prepare an indigo plant dye.

That is, as the air is injected into the indigo plant extract, the water-soluble indigo plant pigment is bound to oxygen to form an insoluble indigo plant pigment. In this case, the insoluble indigo plant pigment is condensed due to the cohesion caused by the chemical reaction of the lime powder, and the insoluble indigo plant pigment condensed with the lime powder is separated from water while precipitating onto the bottom of the container when the insoluble indigo plant pigment is kept for a given period of time (approximately 2 to 3 hours) after the air injection is stopped.

In this case, the insoluble indigo plant pigment condensed with the lime powder precipitated onto the bottom of the container becomes a semi-solid phase like tofu. Then, when the insoluble indigo plant pigment condensed with the lime powder is separated from water after precipitation of the insoluble indigo plant pigment is completed, a supernatant is decanted from the container, and the insoluble indigo plant pigment precipitated onto the bottom of the container is filtered to remove moisture, thereby preparing an indigo plant dye.

Then, the indigo plant dye is left at room temperature in the shade (at room temperature, that is, a temperature of 15 to 30° C. in the shade in summer) for 5 to 10 days to form a mildew ferment strain.

That is, when the indigo plant dye is left at room temperature in the shade for 5 to 10 days to form the mildew ferment strain, fermentation is not readily performed due to an increase in microorganisms in an indigo plant dye solution fermentation operation (S3) as will be described later.

In this case, when a period of time required for forming a ferment strain through the fermentation of the indigo plant dye is less than 5 days, the fermentation time may be lengthened accordingly due to a decrease in microorganisms, and thus the fermentation is ineffective. On the other hand, when the fermentation time exceeds 10 days, the indigo plant dye may be putrefied.

As described above, when the indigo plant dye undergoes the indigo plant dye preparation operation (S2), a natural indigo plant dye most suitable for natural fermentation may be prepared.

3. Indigo Plant Dye Solution Fermentation Operation (S3)

The indigo plant dye solution fermentation operation (S3) includes aging a dye solution, which is prepared by mixing caustic soda with the indigo plant dye prepared in the indigo plant dye preparation operation (S2), at a predetermined temperature for a given period of time, adding a sugar, and performing microbial fermentation on the dye solution for a given period of time to reduce the insoluble indigo plant pigment into a water-soluble indigo plant pigment.

More particularly, the indigo plant dye solution fermentation operation (S3) is first performed by mixing charcoal, which is obtained by burning a plant, with water to prepare caustic soda with pH 10 to 12.5.

That is, charcoal obtained by burning dried plants (stems of an indigo plant, a soybean, a hemp plant, a goosefoot, etc.) is mixed with water, and caustic soda is extracted from the mixture of charcoal and water. In this case, an amount of the charcoal mixed with water is adjusted to prepare caustic soda with pH 10 to 12.5.

Here, when a pH value of the caustic soda is less than pH 10, the indigo plant extract may be easily putrefied due to the growth of putrefactive bacteria. On the other hand, when the pH value of the caustic soda exceeds pH 12.5, the growth of the microbial ferment strain may be inhibited.

Next, a container is prepared, and a dye solution is prepared by mixing the caustic soda with the indigo plant dye prepared in the indigo plant dye preparation operation (S2) at a certain ratio.

In this case, a mixing ratio of the indigo plant dye and the caustic soda may be in a range of 1:3 to 1:30.

That is, a fiber is dyed in dark blue or indigo with one dyeing as a ratio of the indigo plant dye increases, and dyed in jade green or sky blue as a ratio of the caustic soda increases. When a fiber dyed in a dark color is required, the dyeing maybe repeatedly performed several times to obtain a fiber dyed in dark blue or indigo.

Subsequently, the dye solution (pH 10 to 12.5) obtained by mixing the caustic soda with the indigo plant dye is aged at a temperature of 15 to 30° C. for 7 to 15 days.

Here, when the temperature of the dye solution is less than 15° C., fermentation may be stopped, whereas the fermentation may be excessively carried out when the temperature of the dye solution exceeds 30° C.

That is, when the fermentation is performed at a proper temperature, the fermentation may be repeatedly performed by living microorganisms even after dyeing of a fiber, which makes it possible to continue to dye a fiber using the dye solution. However, when the fermentation is excessively performed, the reuse of the dye solution is impossible.

Also, a gradual decrease in oxygen takes place since microorganisms make use of oxygen in the dye solution during an aging time of the dye solution. In this case, when the aging time of the dye solution is less than 7 days, a large amount of oxygen remains in the dye solution due to a short period of time required for the microorganism to make use of oxygen in the dye solution. When a large amount of oxygen remains in the dye solution, a time required for reducing the insoluble indigo plant pigment into the water-soluble indigo plant pigment may increase.

When the aging time of the dye solution exceeds 15 days, preparation of a dye solution used to dye a fiber may be delayed accordingly.

Then, a predetermined amount of a sugar is added to the aged dye solution, and microbially fermented for a given period of time to reduce the insoluble indigo plant pigment into a water-soluble indigo plant pigment.

Various kinds of sugars suitable for growth of microorganisms may be used as the sugar. For example, grain syrup (sugar prepared by brewing a sweet drink made from fermented rice) or glucose may be used herein.

The sugar may be added at a content of approximately 30 ml, based on the total amount of the dye solution obtained by mixing 30 kg of the indigo plant dye and 200 L of caustic soda. However, an amount of the added sugar may be properly adjusted within a range of 20 to 100 ml, depending on a fermentation state. In this case, 10 ml of the sugar is added at the very beginning, and the sugar may be gradually added according to a fermentation state.

Here, when the amount of the added sugar is less than 20 ml based on the total amount of the dye solution obtained by mixing 30 kg of the indigo plant dye and 200 L of the caustic soda, the growth of microorganisms may be inhibited, whereas the fermentation may be excessively carried out when the amount of the added sugar exceeds 100 ml.

Meanwhile, the microbial fermentation may be performed at least 5 days after the sugar is added to the aged dye solution, so that oxygen can be completely consumed from the dye solution.

Then, when the fermentation is completed, a surface (i.e., a water surface) of the indigo plant dye solution is tinged with indigo or dark blue, and the inside of the indigo plant dye solution turns pale green.

That is, when the microorganisms consume oxygen in the dye solution during the fermentation process, the insoluble indigo plant dye solution (pigment) is reduced to a water-soluble indigo plant dye solution. In this case, the water-soluble indigo plant dye solution turns pale green. Then, the surface (i.e., a water surface) of the indigo plant dye solution in contact with the air is oxidized to return to indigo or blue.

In addition, an indigo surface membrane formed on the surface of the indigo plant dye solution is removed. In this case, the indigo plant dye solution tinged with lime green remains when the dark blue surface membrane is removed.

Meanwhile, when the microorganisms consume oxygen in the dye solution during the fermentation process to reduce the insoluble indigo plant dye solution (pigment) into a water-soluble indigo plant dye solution, the lime powder condensed with the insoluble indigo plant pigment is separated from the water-soluble indigo plant pigment, and then precipitated onto the bottom of the container.

4. Fiber Dyeing Operation (S4)

The fiber dyeing operation (S4) includes immersing the fiber in the water-soluble indigo plant dye solution microbially fermented in the indigo plant dye solution fermentation operation for a given period of time so as to dye a fiber.

In this case, the fiber may be immersed in the water-soluble indigo plant dye solution for 5 to 20 minutes with no portions of the fiber overlapping, and taken out to be brought into contact with the air.

That is, the fiber is dyed while binding to the water-soluble indigo plant pigment in the container containing the indigo plant dye solution. Then, when the fiber is taken out of the container to be brought into contact with the air, the water-soluble indigo plant pigment is bound to the fiber while being reduced into the insoluble indigo plant pigment. As a result, a natural indigo plant dye, which is not easily dissolved and discolored in water and a detergent, is prepared.

When the fiber is immersed in the water-soluble indigo plant dye solution for less than 5 minutes, only a surface of the fiber may be dyed without sufficiently absorbing the water-soluble indigo plant pigment into the fiber. On the other hand, when the immersing time exceeds 20 minutes, the productivity of a fiber may be reduced.

In the fiber dyeing operation (S4), the dying using an indigo plant may also be repeatedly performed once to several times to obtain a fiber having a desired color.

Both of a vegetable fiber and an animal fiber may be dyed. In particular, the vegetable fiber, for example, cotton, a ramie fabric, a hemp cloth, or artificial silk is dyed at a rapid dyeing rate, shows excellent color fastness, and is not easily dissolved and discolored in water or a detergent. Also, the natural dyeing method may be used to prevent water pollution or dermatitis.

5. Washing and Neutralizing Operation (S5)

In the washing and neutralizing operation (S5), since the lime powder used to prepare the indigo plant dye and the caustic soda used to ferment the indigo plant remain in the fiber, the dyed fiber is washed and neutralized after the dyeing of the fiber is completed in the fiber dyeing operation (S4).

The washing is performed, as follows: cold/warm washing and dry washing may be performed approximately 10 times to remove the lime powder and the caustic soda sufficiently. An acid such as acetic acid may be used as a neutralizing agent, and the fiber may be dipped and neutralized in water (pH 4) for 10 minutes.

The color fastness and color of the dyed fiber may be maintained more excellently when the dyed fiber is washed and neutralized as described above.

MODE FOR INVENTION

Hereinafter, embodiments of the present invention will be described in detail.

(1) Elution of Indigo Plant Pigment

First, an indigo plant (leaves and stems) was fully put into an 800 L container, which was then filled with water.

An indigo plant pigment was extracted in water having a temperature of 25° C. for 48 hours.

The leaves and stems of the indigo plant were taken out of the container to separate an indigo plant extract. As a result, the indigo plant extract was prepared in the container at a yield of 400 L.

(2) Preparation of Indigo Plant Dye

The shells of shellfishes (cockles, oysters, densely lamellated oysters, etc.) were baked and calcined at a high temperature of 1000° C. or more for 24 hours to prepare a natural lime powder. Then, 1200 g of the lime powder was added to 400 L of the indigo plant extract, and air was injected to the resulting mixture for one hour.

When the lime powder and the air were added to the indigo plant extract, a chemical reaction between the lime powder and the indigo plant extract took place. As a result, the lime powder served to emit hot air and became a semi-solid phase due to the cohesion. Then, the indigo plant extract was reduced to an insoluble indigo plant pigment while the indigo plant extract turned from pale green (sea green to chartreuse) through yellow and green to indigo as oxygen in the injected air was bound to the water-soluble indigo plant pigment.

In addition, the indigo plant pigment reduced into the insoluble indigo plant pigment was condensed with the lime powder, and then became a semi-solid phase.

When the indigo plant extract turned dark indigo as described above, air injection was stopped, and the indigo plant extract was kept for approximately 2 to 3 hours. As a result, the insoluble indigo plant pigment condensed with the lime powder was separated from water while precipitating onto the bottom of the container.

Then, a supernatant was decanted from the container, and the insoluble indigo plant pigment precipitated onto the bottom of the container was filtered to remove moisture, thereby preparing an indigo plant dye.

In this case, the indigo plant dye was prepared at a yield of approximately 3 to 4 kg, and a color of the indigo plant dye was tinged with dark blue or navy blue.

The indigo plant dye prepared thus was fermented at room temperature (i.e., 20° C.) in the shade for 7 days to form a mildew ferment strain.

(3) Fermentation of Indigo Plant Dye Solution

Water was added to charcoal obtained by burning the dried leaves and stems of the indigo plant, and boiled to prepare caustic soda (pH 12).

A container was prepared, and 200 L of the caustic soda and 30 kg of the indigo plant dye were put into the container, and left alone.

The dye solution obtained by mixing the indigo plant dye with the caustic soda had a pH value of pH 12.5. Then, the dye solution was aged at a temperature of 25° C. for 10 days, and 30 ml of grain syrup was added to the dye solution. The resulting mixture was fermented for approximately 7 days.

A surface (i.e., a water surface) of the fermented indigo plant dye solution was tinged with indigo or dark blue, and the inside of the indigo plant dye solution had turned pale green.

(4) Fiber Dyeing

A fiber was immersed in the sufficiently fermented indigo plant dye solution (i.e., an indigo plant dye solution reduced into a water-soluble indigo plant dye solution by microorganisms) for approximately 10 minutes so that the fiber was dyed with no portions of the fiber overlapping, and taken out to be brought into contact with the air.

In this case, the fiber in the container containing the indigo plant dye solution was dyed while binding to the water-soluble indigo plant dye solution (pigment). When the fiber was taken out of the container, the water-soluble indigo plant dye solution bound to the fiber was reduced into an insoluble pigment while bringing the fiber into contact with oxygen in the air.

To obtain a fiber having a desired color, the dyeing using the indigo plant was repeatedly performed once to several times. In this case, the fiber was dyed in sky blue, blue and dark blue when the fiber was dyed once, twice and three or more times, respectively.

(5) Washing and Neutralization

When the dyeing of the fiber was completed, the dyed fiber was washed and neutralized because the lime powder used to prepare the indigo plant dye and the caustic soda used to ferment the indigo plant remained in the dyed fiber.

Cold/warm washing and dry washing were performed approximately 10 times to remove the lime powder and the caustic soda sufficiently. An acid such as acetic acid was used as a neutralizing agent, and the fiber was dipped and neutralized in water (pH 4) for 10 minutes.

The color fastness and color of the dyed fiber were maintained more excellently when the dyed fiber was washed and neutralized as described above.

The invention claimed is:

1. A natural dyeing method of a fiber comprising:
  an indigo plant pigment elution operation (S1) of eluting a water-soluble indigo plant pigment by filling a container with an indigo plant and water having a predetermined temperature and extracting the mixture of the indigo plant and the water for a given period of time;
  an indigo plant dye preparation operation (S2) of preparing an indigo plant dye by injecting lime powder and air into the indigo plant extract eluted in the indigo plant pigment elution operation (S1), decanting water when an insoluble indigo plant pigment formed by bonding oxygen to the indigo plant pigment is condensed and precipitated due to cohesion caused by a chemical reaction of the lime powder and removing moisture from the insoluble indigo plant pigment condensed with the lime powder;
  an indigo plant dye solution fermentation operation (S3) of reducing the insoluble indigo plant pigment into a water-soluble indigo plant pigment by aging a dye solution, which is prepared by mixing caustic soda with the indigo plant dye prepared in the indigo plant dye preparation operation (S2), at a predetermined temperature for a given period of time, adding a sugar and performing microbial fermentation on the dye solution for a given period of time; and
  a fiber dyeing operation (S4) of dyeing a fiber by immersing the fiber in the indigo plant dye solution microbially fermented in the indigo plant dye solution fermentation operation (S3) for a given period of time.

2. The natural dyeing method according to claim 1, wherein the indigo plant pigment elution operation (S1) is performed by extracting the indigo plant pigment at a water temperature of 15 to 30° C. for a given period of time, and the indigo plant pigment is extracted at a water temperature of 15 to 19° C. for 51 to 70 hours, and extracted at a water temperature of 20 to 30° C. for 40 to 50 hours.

3. The natural dyeing method according to claim 1, wherein the indigo plant dye preparation operation (S2) comprises:
  preparing lime powder obtained by baking and calcining shells at a high temperature;
  adding the lime powder at a content of 100 to 500 g, based on 100 L of the indigo plant extract eluted in the indigo plant pigment elution operation (S1);
  injecting air into the indigo plant extract to which the lime powder is added, wherein the air injection is performed until a color of the indigo plant extract turns from pale green to indigo;
  preparing an indigo plant dye by decanting water when water is separated while the insoluble indigo plant pigment prepared by bonding oxygen to the indigo plant pigment dissolved in the indigo plant extract is condensed and precipitated due to cohesion caused by a chemical reaction of the lime powder, and removing moisture from the insoluble indigo plant pigment condensed with the lime powder; and
  forming a ferment strain by fermenting the indigo plant dye in the shade for a given period of time.

4. The natural dyeing method according to claim 1, wherein the indigo plant dye solution fermentation operation (S3) comprises:
  preparing caustic soda with pH 10 to 12.5 by mixing charcoal with water, the charcoal being obtained by burning a plant;
  preparing a dye solution by mixing the indigo plant dye prepared in the indigo plant dye preparation operation (S2) with the caustic soda at a certain ratio;
  aging the dye solution at a temperature of 15 to 30° C. for a given period of time; and
  reducing the aged dye solution into a water-soluble indigo plant pigment by adding a certain amount of a sugar to the aged dye solution and performing microbial fermentation on the dye solution for a given period of time.

5. The natural dyeing method according to claim 1, wherein the fiber dyeing operation (S4) is performed by immersing a fiber in the indigo plant dye solution microbially fermented in the indigo plant dye solution fermentation operation (S3) for 5 to 20 minutes to dye the fiber, taking the fiber out of the indigo plant dye solution, and bringing the dyed fiber into contact with air.

6. The natural dyeing method according to claim 1, further comprising:
  a washing and neutralizing operation (S5) of performing cold/warm washing and dry washing on the dyed fiber to remove the lime powder or caustic soda remaining in the dyed fiber and simultaneously neutralizing the dyed fiber with a neutralizing agent after the fiber dyeing operation (S4).

* * * * *